US008191950B2

(12) United States Patent
van Amelsfoort

(10) Patent No.: US 8,191,950 B2
(45) Date of Patent: Jun. 5, 2012

(54) WORK TOOL FOR A MACHINE

(75) Inventor: Edward van Amelsfoort, Tilburg (NL)

(73) Assignee: Caterpillar Work Tools B.V., S-Hertogenbosch (NL)

( * ) Notice: Subject to any disclaimer, the term of this patent is extended or adjusted under 35 U.S.C. 154(b) by 0 days.

(21) Appl. No.: 12/733,604

(22) PCT Filed: Sep. 11, 2008

(86) PCT No.: PCT/EP2008/062096

§ 371 (c)(1),
(2), (4) Date: May 13, 2010

(87) PCT Pub. No.: WO2009/034144

PCT Pub. Date: Mar. 19, 2009

(65) Prior Publication Data

US 2010/0283275 A1 Nov. 11, 2010

(30) Foreign Application Priority Data

Sep. 11, 2007 (EP) .................................... 07116160

(51) Int. Cl.
*B25J 15/02* (2006.01)

(52) U.S. Cl. ....................................... 294/198; 414/729

(58) Field of Classification Search .................. 294/106, 294/111, 198; 414/729; 901/39
See application file for complete search history.

(56) References Cited

U.S. PATENT DOCUMENTS

| | | | | |
|---|---|---|---|---|
| 3,279,329 | A | 10/1966 | Floer | |
| 4,426,110 | A * | 1/1984 | Mitchell et al. | 294/198 |
| 5,984,617 | A * | 11/1999 | Seaberg | 414/623 |
| 2004/0000811 | A1 * | 1/2004 | Kehler | 299/36.1 |

FOREIGN PATENT DOCUMENTS

| | | | |
|---|---|---|---|
| DE | 2533076 | A * | 2/1977 |
| DE | 296 21 601 | U1 | 12/1996 |
| DE | 29621601 | U1 * | 4/1998 |
| DE | 202007002403 | U1 | 5/2007 |
| DE | 202007002403 | U1 * | 5/2007 |
| GB | 1175390 | | 12/1969 |

OTHER PUBLICATIONS

WIPO; International Search Report and Written Opinion; Dec. 12, 2008; International Searching Authority; EPO; Rijswijk, NL.

* cited by examiner

*Primary Examiner* — Saul Rodriguez
*Assistant Examiner* — Gabriela Puig
(74) *Attorney, Agent, or Firm* — Liell & McNeil

(57) ABSTRACT

According to one exemplary aspect there is provided a work tool for attachment to a machine, comprising a supporting tool portion. The actuatable tool portion is pivotally connected to the supporting tool portion via a hinge construction. The hinge construction includes a hinge drive having an outgoing, rotatable shaft. The rotatable shaft has a single outgoing end that is configured to carry the actuatable tool portion. By providing the work tool with a hinge construction that includes a hinge drive with an rotatable shaft that carries the actuatable tool portion on a single outgoing end a directly driven hinge construction is obtained that is both compact and reliable. A hinge drive and method of operating a work tool for a machine are also disclosed.

18 Claims, 5 Drawing Sheets

WORK TOOL FOR A MACHINE

TECHNICAL FIELD

The present disclosure relates to a work tool for a machine and, more particularly, to such a work tool having an actuatable tool portion.

BACKGROUND

Work tools having one or more actuatable tool portions, such as grapples, crushers, pulverizers and shears are well known implements that are commonly carried on the boom of a machine, for example a hydraulic excavator. The actuatable tool portion may form an elongated, arm-like structure that is pivotably connected to a supporting tool portion via a hinge. An example of a work tool having such an actuatable tool portion is a CAT multi tine orange peel grapple of the GSHB series. The actuatable tool portion is conventionally driven to actuate by using hydraulic cylinders. Hydraulic cylinders and the hoses to power them are prone to damage and need protection from the work environment. Further, a cylinder construction increases weight and occupies space, which decreases flexibility and design of the tool. The current disclosure aims to alleviate or overcome one or more of the disadvantages associated with the prior art.

SUMMARY OF THE DISCLOSURE

According to one exemplary aspect of the disclosure there is provided a work tool for attachment to a machine, comprising a supporting tool portion. An actuatable tool portion is pivotally connected to the supporting tool portion via a hinge construction. The hinge construction includes a hinge drive having an outgoing, rotatable shaft. The rotatable shaft has a single outgoing end that is configured to be associated with the actuatable tool portion.

According to another exemplary aspect of the disclosure, there is provided a hinge drive for a work tool. The work tool comprises a base portion configured to be mounted to a supporting tool portion of the work tool, and a rotatable shaft configured to be rotatably mounted in the base portion. The rotatable shaft has a single outgoing end. The outgoing end is configured to carry the actuatable tool portion, such that in use, the hinge drive pivotally actuates the actuatable tool portion.

According to yet another exemplary aspect of the disclosure, there is provided a method of operating a work tool of a machine in which an actuatable tool portion of the work tool is pivotally actuatable relative to a supporting tool portion of the work tool. The method comprises the step of rotationally driving a rotatable shaft that carries the actuatable tool portion on a single outgoing end thereof.

Other features and aspects of this disclosure will be apparent from the following description and the accompanying drawings. It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of the specification, illustrate exemplary embodiments of the disclosure and, together with the description, serve to explain the principles of the disclosure. In the drawings.

DETAILED DESCRIPTION

Figure 1:
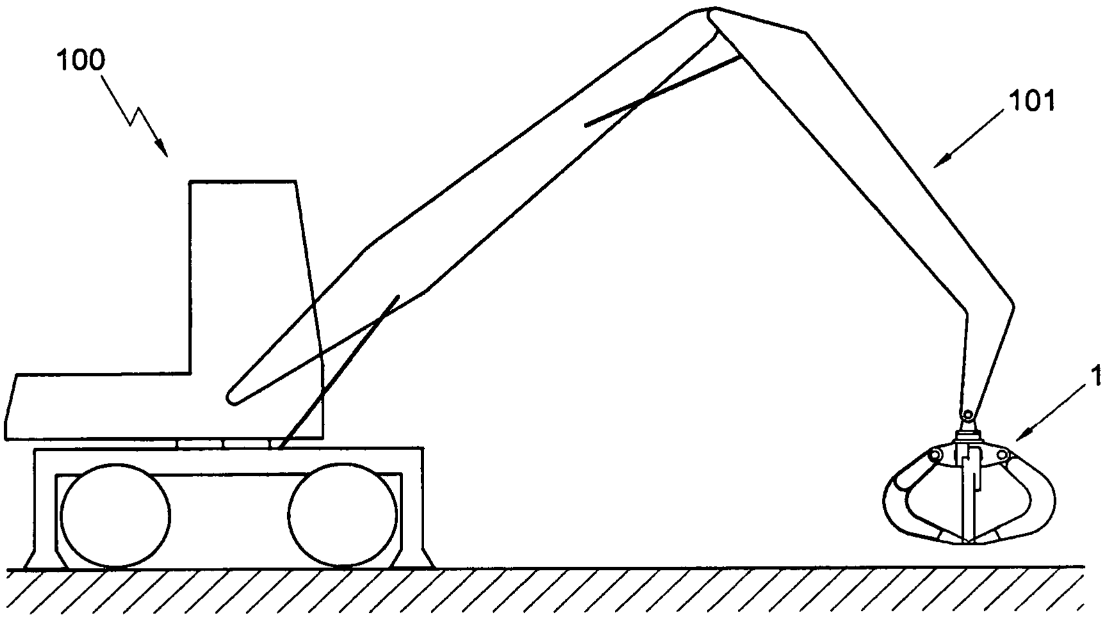
FIG. 1 is a schematic side view of a machine carrying an exemplary work tool in accordance with the disclosure.

Reference will now be made in detail to embodiments of the disclosure, examples of which are illustrated in the accompanying drawings. Wherever possible, the same reference numbers are used throughout the drawings to refer to the same of like parts. Referring to FIG. 1, an exemplary embodiment of the current disclosure shows a machine 100 which may be a mobile machine such as for example an excavator, a back hoe, a digger, a loader, a knuckle boom loader, a harvester or a forest machine. The machine 100 as shown in the exemplary embodiment of FIG. 1 is an hydraulic excavator. A work tool 1 is attached to the machine. The work tool may be a grapple, a pulverizer, a shear, or other such work implement. The work tool 1 as shown in the exemplary embodiment is an orange peel grapple that is carried on a boom 101 of the machine 100. It shall be clear that the machine 100 may carry a plurality of work tools 1, and that the work tool or tools may also be mounted on an arm, a frame part or on a hoist of the machine.

Figure 2:
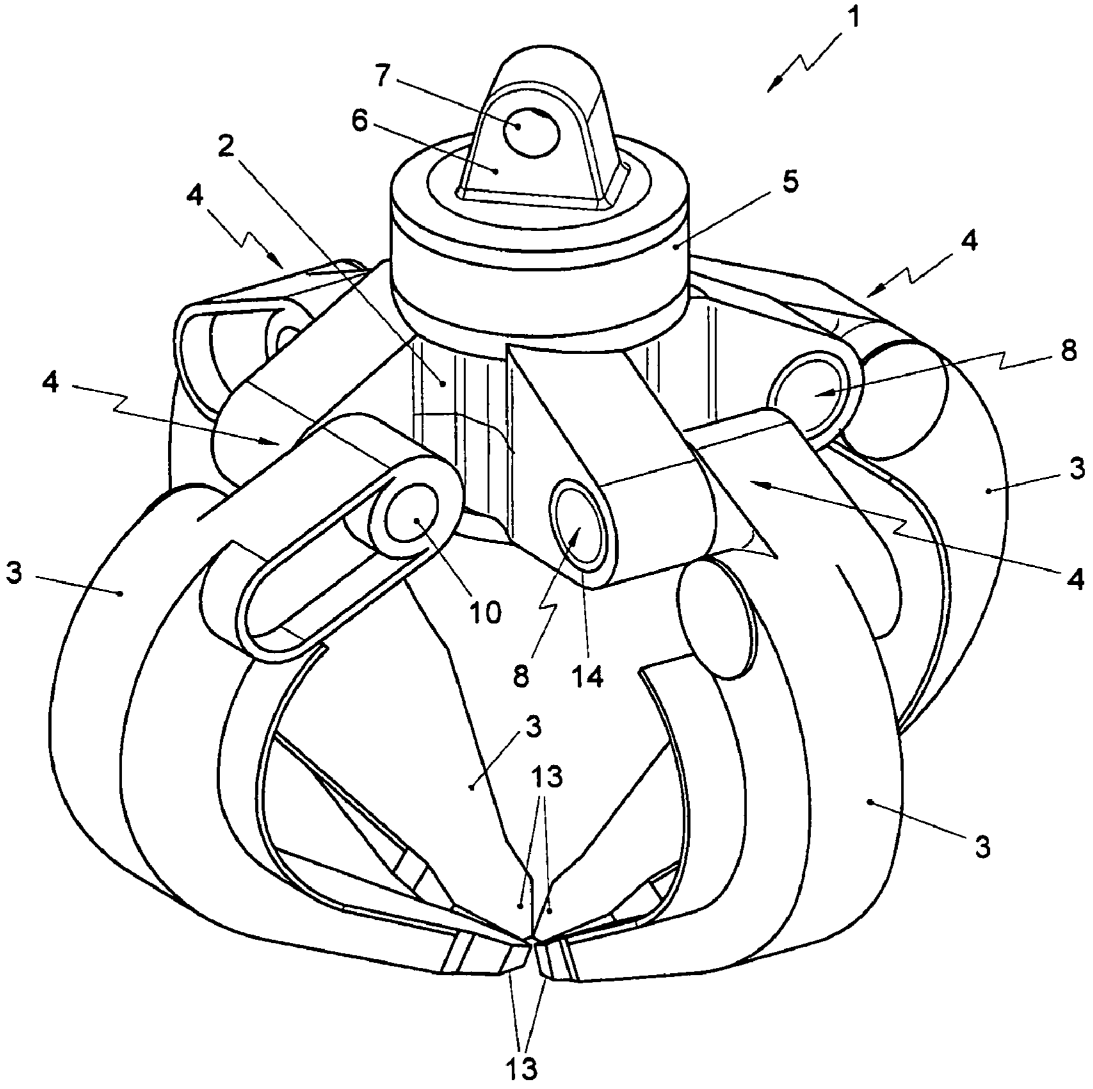
FIG. 2 is a first schematic perspective illustration of an exemplary work tool in accordance with the disclosure in a closed configuration.
Figure 3:
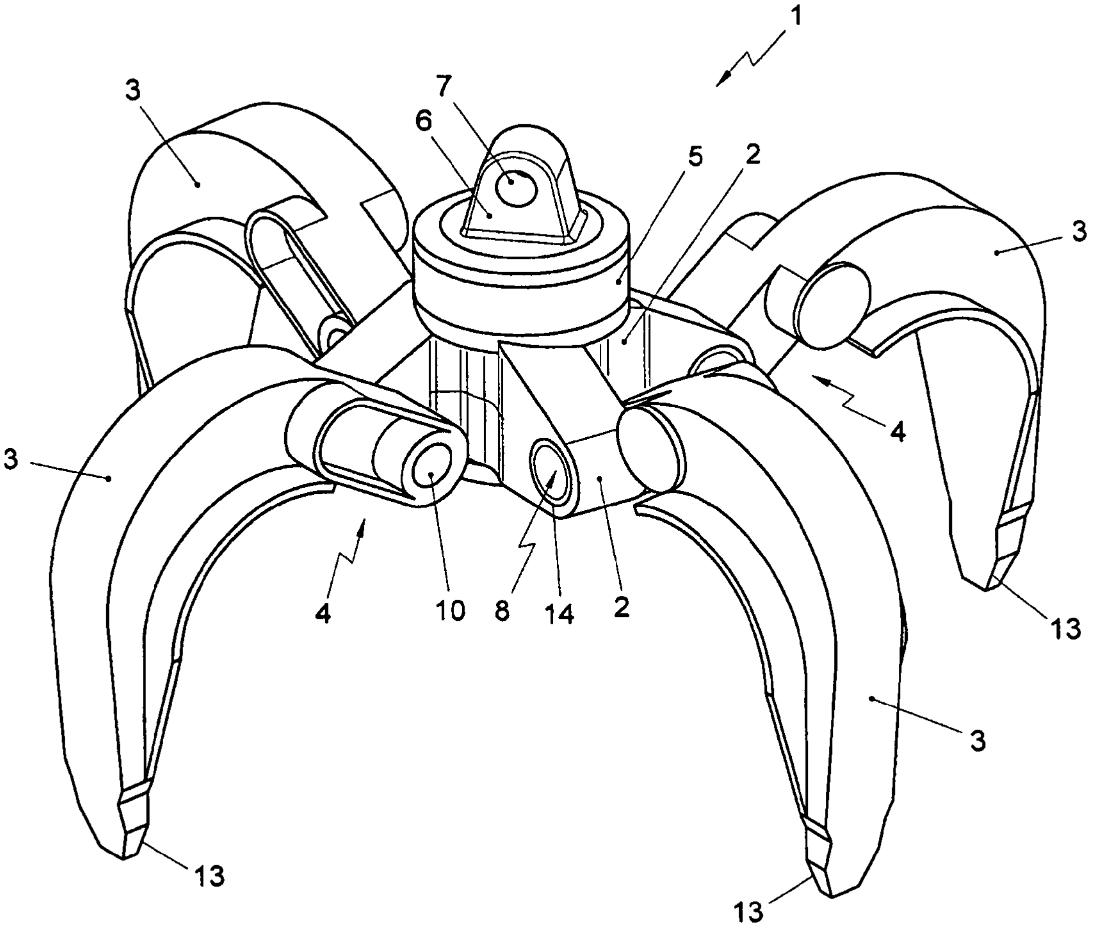
FIG. 3 is a second schematic perspective illustration of the work tool of FIG. 2 in an open configuration.

Referring to FIGS. 2 and 3, an exemplary embodiment of a work tool 1 is shown in detail. The work tool 1 comprises a supporting tool portion 2 that supports at least one actuatable tool portion 3. The supporting tool portion 2 may form a base, but may also in itself be supported on a base, as would for example be the case in an articulated work tool 1. In the example of FIG. 1, the base or main body of the work tool 1 forms the supporting tool portion 2. The supporting tool portion 2 is in the example rotatably carried on a rotation unit 5, for example a hydraulic rotation unit known in the art. The rotation unit 5 may be provided with a connecting flange 6 having a bore 7 for receiving a coupling of the machine 100. However, both the rotation unit 5 and its connection to the machine 100 may be embodied in any other way.

The work tool 1 may comprise a plurality of actuatable tool portions 3, or may comprise only a single actuatable tool portion 3. In the example of FIG. 1, four actuatable tool portions 3 are connected to the supporting tool portion 2. In the work tool of the example, the actuatable tool portions 3 each form an arm, or "tine" of the grapple. The actuatable tool portion 3 may be of any shape.

In accordance with the disclosure, the actuatable tool portion 3 is pivotally connected to the supporting tool portion 2 via a hinge construction 4. The hinge construction 4 includes a hinge drive, generally designated with reference numeral 8. The hinge drive 8 is arranged to pivot the actuatable tool portion 3 relative to the supporting tool portion 2. The hinge drive 8 has an outgoing, rotatable shaft 9 with a single outgoing end 10. The single outgoing end 10 is associated with the actuatable tool portion 2. The single outgoing end 10 may directly or indirectly carry the actuatable tool portion 3. The outgoing end 10 of the rotatable shaft 9 may be free, as shown in the example. If desired, the outgoing end 10 itself may as an alternative be directly supported on the supporting tool portion 3, for example via a support flange carrying a bearing.

The outgoing end 10 of the rotatable shaft 9 may be arranged for rotation about a limited angle, for instance about an angle of less than approximately 90° to realize the desired degree of actuation of the actuatable tool portion relative to the supporting tool portion. For a grapple, it may be desired that the rotational movement may for instance not exceed angular movement of about 70°. For other work tools, the desired rotational movement may be about a smaller maximum angle. For shears, crushers, and pulverizers the angle of rotation may for instance be less than about 45°. The movement may be reciprocating if this is desired for the operation of the work tool.

The pivotable movement of the actuatable tool portion 3 relative to the supporting tool portion 2 may be limited by end stops. Such end stops may be internal or external. External end stops may, for example, be supported on the supporting tool portion 2 and/or on the actuatable tool portion 3. In the present example, external end stops that cooperate to define a closed position of the grapple as shown in FIG. 2 may be formed by the front edges 13 of the actuatable tool portions 3 that limit further closing movement by contacting each other. External end stops that cooperate to define an open position as shown in FIG. 3 may for example be provided on the supporting tool portion 2 and the actuatable tool portions 3 respectively. In addition or as an alternative, the end stops may also be internal. Such internal end stops may be provided on the hinge drive 8 itself, and shall be discussed further on.

In the exemplary embodiment, the supporting tool portion 2 carries a plurality of hinge drives 8, namely four. Each hinge drive 8 may carry its own actuatable tool portion 3. The number of hinge drives 8 in the work tool 1 may however be higher or lower. Further, each hinge drive 8 may carry more than one actuatable tool portion 3. Also, the actuatable tool portions 3 need not be identical to each other as shown in the example, but may be different from each other.

The hinge drives 8 may operate unsynchronized relative to each other, which may further simplify the design of the work tool. However, if desired, at least a number of the hinge drives 8 may be synchronized in their operation, for example using a mechanical linkage or hydraulic arrangement. If desired, at least one actuatable tool portion 3 may be provided with at least one further hinge drive 8.

As shall be discussed below, the hinge drive 8 may comprise a hydraulic rotator 11. However, the hinge drive may also comprise an electric motor, for example a direct drive brushless DC electromotor, or a magnetic drive. By embodying the rotatable shaft 9 as the drive shaft of the rotator, electric motor or magnetic drive, the compactness, simplicity and reliability of the construction can be enhanced.

The hinge drive 8 may comprise a base portion 12 that may be configured to be mounted on the support tool portion 2. Such a detachable configuration facilitates the exchange of the hinge drive 8 as a unit. However, the hinge drive 8 may also be integrated in the supporting tool portion 2.

Figure 4:
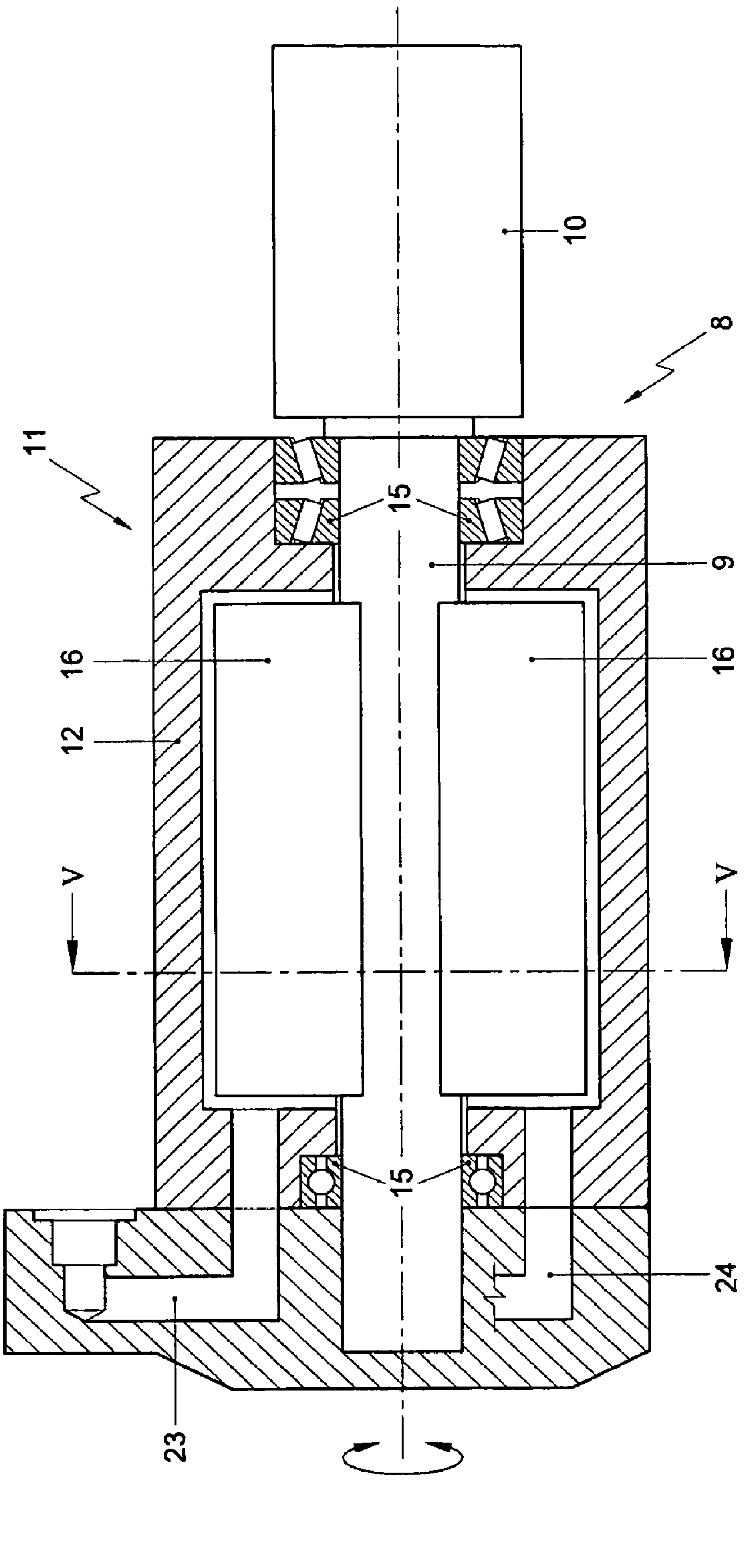
FIG. 4 a diagrammatic longitudinal sectional view of an exemplary hinge drive in accordance with the disclosure.
Figure 5:
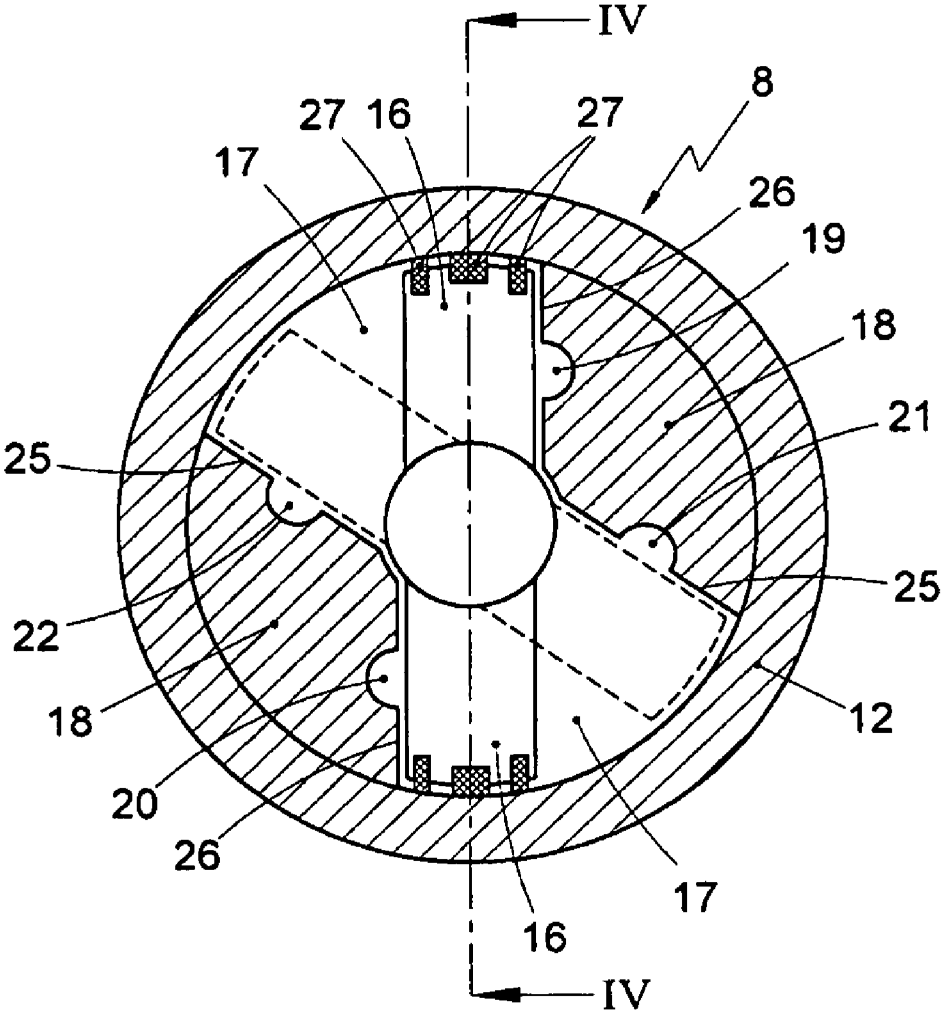
FIG. 5 is a diagrammatic cross sectional view of the hinge drive of FIG. 4 along the line V-V in FIG. 4.

Referring to FIGS. 4 and 5, a hinge drive 8 for the work tool 1 of FIGS. 2 and 3 is shown. The hinge drive 8 comprises a base portion 12 configured to be mounted in a mounting recess 14 of the work tool 1. The rotatable shaft 9 of the hinge drive 8 here forms a directly driven shaft 9 that is configured to be rotatably mounted in the base portion 12. The rotatable shaft 9 may thus form the hinge pin of the hinge construction 4. The rotatable shaft 9 is supported inside the base portion by bearings 15.

A single outgoing end 10 may be configured to carry the actuatable tool portion 3. In use, the hinge drive 10 pivotally actuates the actuatable tool portion 3 as shall be discussed more in detail in the next section. The rotatable shaft 9 of the rotator may be arranged for rotational movement about an angle of less than about 90°, in particular less than about 70°. The hydraulic connections may be integrated in the supporting tool portion 2, which enhances reliability of the work tool 1. The rotatable shaft 9 may carry two vanes 16, each being situated for reciprocating movement in a pressure chamber 17 defined in the base portion 12. The number of vanes 16 may be increased if a larger torque or a more compact drive is needed. The pressure chambers 17 in the base portion 12 are defined between projections 18. The faces 25 and 26 of the projection 18 form internal end stops for the vanes 16.

The vanes 16 may be provided with seals 27 around their periphery, to prevent pressurized fluid leaking from the chambers 17 in a conventional way. Similar conventional seals may be provided on the rotatable shaft 9 between the bearings 15 and the chambers 17.

Each pressure chamber 17 may be provided with a set of ports 19, and 21, 22. The ports 19, 20, 21, 22 are connected to hydraulic lines for supply and removal of hydraulic fluid. In FIG. 4, a first hydraulic line 23 and a second hydraulic line 24 are visible. The ports 19, 20, 21, 22 and the supply and removal of hydraulic fluid may be controlled by a conventional hydraulic system. The hydraulic rotators of the hinge drives 8 may be connected to a single hydraulic pressure source (not shown), which may also be of a conventional type.

As shown, the diameter of the rotatable shaft 9 may for example be about 70 mm, while the working diameter of the shaft at the vanes 16 may for example be about 140 mm. When the length of the vanes is chosen at about 150 mm as shown, the total torque exerted on the actuated tool portion may for example be about 20 kNm. The hydraulic working pressure may be conventional, for example in the range of about 350 Bar.

INDUSTRIAL APPLICABILITY

During operation of a machine 100 such as a hydraulic excavator, the work tool 1 is carried on the arm or boom 101 of the machine. Using the boom 101, the work tool 1 is moved around the working environment. In the present example, the work tool 1 is an orange peel grapple. During use, the grapple may be brought into position near a pile of scrap to be moved. At this point, the tines that form the actuatable tool portions 3, are or have been brought into an open configuration of the work tool 1 (FIG. 3) by rotating the actuatable tool portions 3 relative to the supporting tool portion 2 with the hinge drive 8. Next, the hinge drive 8 is driven in an opposite, closing direction, so that the actuatable tool portions 2 close around a heap of scrap to be moved. During this action, the hinge drive 8 rotates the actuatable tool portions 3 relative to the supporting tool portion 2 until for example an operator or control device stops the system, and/or the internal or external end stops cooperate. In the work tool 1 of the example, this normally occurs because the front edges 13 of the actuatable tool portions 3 meet each other, or the vanes 16 meet the projections 18.

After closing of the grapple, the boom 101 is moved to a location where the scrap is to be released. There, the actuatable tool portions of the grapple 1 are driven towards the open configuration of the work tool 1 (FIG. 3) using the hinge drives 8. In many cases it will not be necessary to drive the actuatable tool portions to the fully opened position to release the scrap, or to be able to grab a new pile of scrap.

If desired, the supporting tool portion 2 can be rotated relative to the boom 101 using rotation unit 5, for example by applying hydraulic pressure to it in case of a hydraulic rotation unit 5. The rotation unit 5 may be hydraulically operated, but may also comprise an electric or magnetic drive.

During the closing movement, hydraulic pressure is fed into a portion of pressure chambers 17 via ports 19, 20 that are connected to first hydraulic line 23. This drives the vanes 16 to move from the position shown in FIG. 5 towards the position shown in the same figure in dotted lines, until it reaches the faces 25 of the projections 18. The faces 25 form first internal end stops. Meanwhile, hydraulic fluid is released from another portion of the chamber 18 at the other side of the vanes 16 via ports 21, 22 that are connected to second hydraulic line 23. During the closing movement, hydraulic fluid is supplied via ports 21, 22 and is released via ports 19, 20, causing the vanes 16 to return until they meet faces 26 that act as internal end stops. During movement towards the position shown in FIG. 5 in dotted lines, ports 19 and 20 act as supply ports, and ports 21 and 22 act as return ports. Pressurized hydraulic fluid is supplied from a pressure source via first hydraulic line 23, and is fed back to the source via second hydraulic line 24. During the return movement, the ports 21 and 22 act as supply ports, and the ports 19 and 20 act as return ports. Hydraulic fluid is supplied from the pressure source via the second hydraulic line 24, and is fed back to the source via the first hydraulic line 23. The movement of the vanes 16 imparts rotational movement to the rotatable shaft 9, with, in one embodiment, a maximum rotational angle of about 70°. The actuable tool portion 3 that is carried on the single outgoing end 10 of the rotatable shaft 9 follows the rotational movement. The rotatable shaft 9 can be driven directly, so that it forms a directly driven hinge pin for the actuatable tool portion 3. In this embodiment, the actuatable tool portion 3 can be actuated using a compact drive only having a single connection between the actuatable tool portion 3 and the supporting tool portion 2.

By providing the work tool 1 with a hinge construction 4 that includes a hinge drive 8 with an rotatable shaft 9 that carries the actuatable tool portion 3 on a single outgoing end 10, a directly driven hinge construction is obtained that is both compact and reliable. A large flexibility in design is obtained. In particular, asymmetric mounting of the actuatable tool portion 3 on a single outgoing end 10 of the rotatable shaft 9 saves constructional space, while the hinge drive can be relatively simple in construction.

It shall be readily apparent to the skilled person that operation of another work tool 1 would be analogous, for example by moving a shear, crusher or pulverizer about the work environment on the boom 101, and by cutting, crushing or pulverizing material by driving the jaws of the tool between the opened and closed configuration. It will also be apparent to those skilled in the art that various modifications and variations can be made in the disclosed work tool for a machine without departing from the scope or spirit of the disclosure. Other embodiments of the disclosure will be apparent to those skilled in the art from consideration of the specification and practice of the disclosure disclosed herein. It is intended that the specification and examples be considered as exemplary only. Although the preferred embodiments of this disclosure have been described herein, improvements and modifications may be incorporated without departing from the scope of the following claims.

What is claimed is:

1. A work tool for attachment to a machine, comprising:
a supporting tool portion;
an actuatable tool portion that is pivotally connected to the supporting tool portion via a hinge construction;
wherein said hinge construction includes a hinge drive, the hinge drive having an outgoing, rotatable shaft with a single outgoing end upon which the actuatable tool portion is carried such that the actuatable tool portion is coupled via only a single connection with the supporting tool portion, and a rotator configured to apply a torque to the rotatable shaft such that a rotation of the rotatable shaft follows a rotation of the rotator at a ratio of 1:1, to pivotally actuate the actuatable tool portion, and wherein a total of one actuatable tool portion of the work tool is pivoted in response to actuating the hinge drive.

2. The work tool according to claim 1, wherein the hinge drive comprises a hydraulic rotator.

3. The work tool according to claim 1, wherein the hinge drive comprises an electric motor or magnetic drive.

4. The work tool according to claim 1, wherein the rotatable shaft is a drive shaft of the hydraulic rotator, electric motor or magnetic drive.

5. The work tool according to claim 1, wherein the hinge drive comprises a base portion configured to be mounted to the supporting tool portion.

6. The work tool according to claim 1 wherein the outgoing end of the rotatable shaft is arranged for rotational movement about an angle of less then about 90°.

7. The work tool according to claim 1, wherein the supporting tool portion carries a plurality of hinge drives, each associated with another actuatable tool portion, and each of the plurality of hinge drives defining a different axis of rotation.

8. The work tool according to claim 7, wherein the hinge drives operate unsynchronized.

9. The work tool according to claim 7, wherein each actuatable tool portion is free of further hinge drives.

10. The work tool according to claim 7, wherein the work tool is a grapple, and wherein the actuatable tool portions are grapple arms.

11. The work tool according to claim 1, wherein the work tool is a shear or crusher, and wherein the actuatable tool portion is a jaw.

12. A hinge drive for a work tool, comprising:
a base portion configured to be mounted to a supporting tool portion of the work tool,
a rotatable shaft defining a longitudinal axis and configured to be rotatably mounted in the base portion, wherein the rotatable shaft has a single outgoing end, which end is configured to carry an actuatable tool portion, such that in use, the hinge drive pivotally actuates the actuatable tool portion,
a rotator configured to apply a torque to the rotatable shaft such that a rotation of the rotatable shaft follows a rotation of the rotator at a ratio of 1:1, to pivotally actuate the actuatable tool portion, and
a first bearing and a second bearing contacting the rotatable shaft and supporting the rotatable shaft within the base portion, wherein the first and second bearings are positioned on opposite axial sides of the rotator.

13. The hinge drive according to claim 12, wherein the rotator comprises an hydraulic rotator.

14. The hinge drive according to claim 12, wherein the drive comprises an electric motor or magnetic drive.

15. The hinge drive according to claim 12, wherein the rotatable shaft is the drive shaft of the rotator.

16. The hinge drive according to claim 12, wherein the outgoing end of the rotatable shaft is arranged for rotational movement about an angle of less than about 90°.

17. A method of operating a work tool of a machine, in which an actuatable tool portion is pivotally actuatable relative to a supporting tool portion, and is coupled with the supporting tool portion via only a single connection, the method comprising the steps of:

applying a torque via a rotator to a rotatable shaft that carries the actuatable tool portion on a single outgoing end thereof;

rotationally driving the rotatable shaft via the applied torque such that a rotation of the rotatable shaft follows a rotation of the rotator at a ratio of 1:1; and wherein the step of rotationally driving further includes driving the rotatable shaft such that a total of one actuatable tool portion pivots in response to driving the rotatable shaft.

18. The method according to claim 17, wherein the rotatable shaft is driven to rotate about an angle of less than about 90°.

* * * * *